United States Patent Office 3,220,884
Patented Nov. 30, 1965

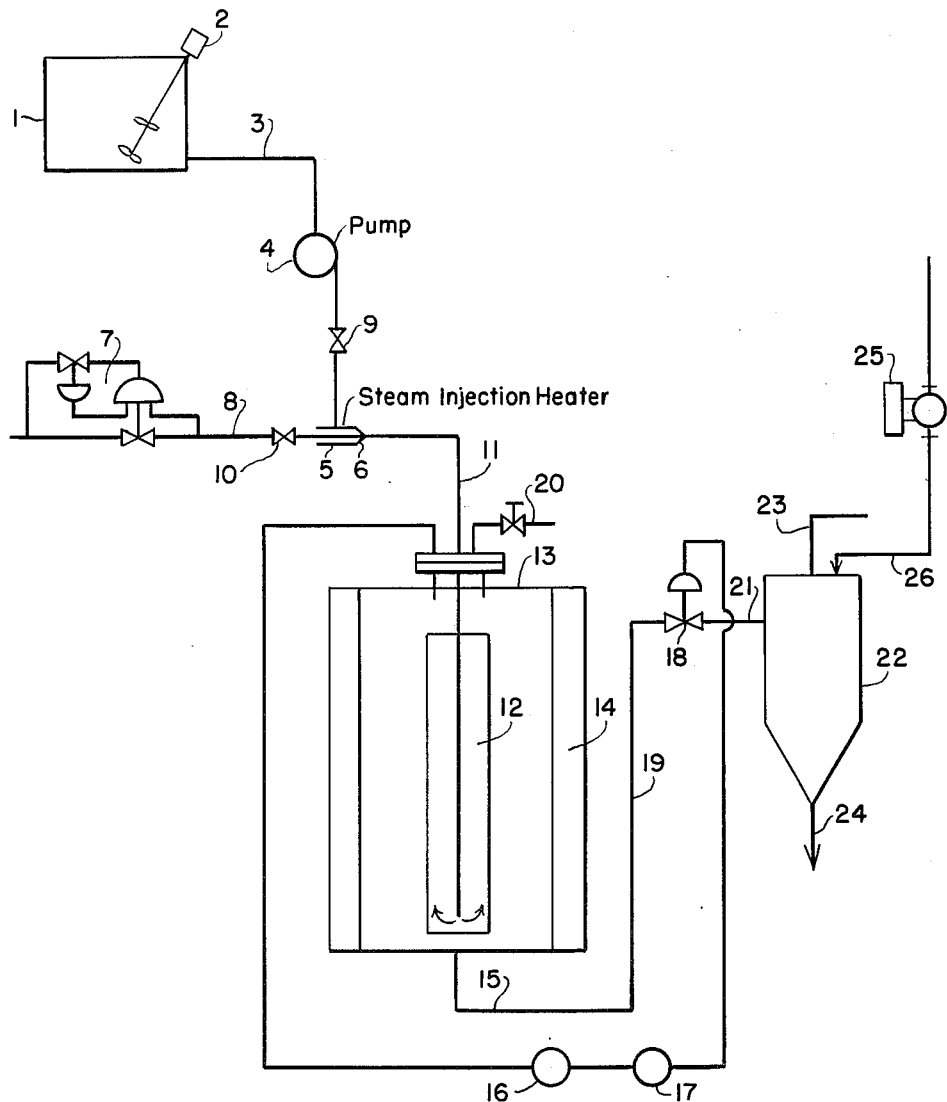

3,220,884
CONTINUOUS PRODUCTION OF INDUSTRIAL STARCH PASTES
Kenneth J. Huber and Jack F. Johnston, Granite City, Ill., and Edward K. Nissen and De Witt R. Pourie, St. Louis, Mo., assignors to Union Starch & Refining Co., Inc., Columbus, Ind., a corporation of Indiana
Filed June 24, 1963, Ser. No. 290,099
4 Claims. (Cl. 127—71)

This invention relates to a process for the continuous production of starch pastes.

Among the objects of the invention is to provide a process for the continuous production of starch pastes.

Among other objects of the invention is to continuously provide a continuous supply of starch paste which has a relatively low and uniform viscosity, and which resists gelling when stored.

Cooked starches such as used in the paper industry, for example, are conventionally prepared by the batch process. Batch prepared, cooked starches unless modified by enzyme conversion or preconverted at the producer's plant have relatively high viscosities and they tend to gel on storage. Also such batch processes are time consuming and require a maximum of attention during the cooking treatment.

Among other objects of the invention, therefore, is to prepare a starch paste of improved quality and consistency by a process and apparatus involving lower handling costs.

The objects of the invention are attained by continuously forming an aqueous starch slurry; positively feeding the slurry to a steam injection heater to substantially instantly heat and gelatinize the starch; continuously conducting the gelatinized starch paste under pressure supplied by the injection heater through a chamber under pressure to continue the conversion until the starch liquor is converted to a paste having the desired paste characteristics (of a modified starch paste, for example); separating excess steam, etc., from the paste and continuously collecting the paste.

This invention is especially useful with corn starch but may be employed with any type of starch such as the starches from wheat, potatoes, tapioca, rice and waxy maize. Although the invention is especially useful for treating unmodified starch thereby avoiding the treatments necessary to modify such starches, it may also be employed for treating thin-boiling, oxidized, ethylated and other chemically modified starches.

The amount of starch in the slurry depends on the particular starch employed and on the properties desired in the final product but generally the slurry will contain about ½ to 3 lbs. of starch per gallon. Various preservatives, bactericides, chemicals, etc., may be incorporated into the slurry.

The starch is fed from the slurrying tank to the steam injection zone at a constant rate. A rate of 3 to 6.5 gallons per minute has been found very satisfactory for a single injection nozzle.

The steam pressure applied to the injection nozzle may vary from about 60 to about 140 pounds per square inch gauge pressure (p.s.i.g.). Below about 60 p.s.i.g. the starch is not completely cooked and the paste resembles that obtained by cooking at atmospheric pressure. Above about 140 p.s.i.g. the paste may be carmelized.

From the time a given slurry leaves the slurry mixing tank until it is passed out of the final cooker will also depend on the type of starch and the properties desired in the final product but periods of about 5–12 minutes have been found to be very satisfactory.

After the starch paste leaves the injector zone, the cooking is continued under pressure at temperatures of between about 250° F. and 350° F. The pressure supplied by the steam of the injector forces the paste, in a closed system, through the chamber which is constructed to prevent channelling of the paste.

The starch paste as it leaves the final converting and pressure zone can be separated at atmospheric pressure from the excess steam and vapor by centrifugal means.

The following table summarizes the condition of operation of the process.

|  | Optimum | Maximum | Minimum |
|---|---|---|---|
| Through-put rate (g.p.m.) | 5 | 6.5 | 3 |
| Steam pressure (p.s.i.g.) | 100 | 140 | 60 |
| Tank level | Full | Full | Empty |
| Retention time with full tank (min.) | 8 | 5 | 12 |
| Discharge temperature (° F.) | 320 | 350 | 250 |
| Paste concentration* (lb./gal.) | ½ to 3 | | |

*Dependent on the type of starch.

The drawing is a flow diagram of the overall process and apparatus.

The slurry is formed in tank 1 which is provided with an agitator 2. The slurry connects through line 3 to a positive displacement pump 4 which feeds the slurry through valve 9 to the steam injector heater 5. Steam is fed through a pressure regulating and adjusting valve means 7 to line 8, valve 10 to the injector heater 5. The injection heater is shown diagrammatically, such devices being known in the art. The granules of starch in the slurry are instantly heated in injector 5 and discharged through orifice 6 into line 11 under pressure. The end of line 11 extends into the pressure cooking vessel 13 down to within a short distance of the bottom of baffle chamber 12. The vessel 13 is closed to the atmosphere and has a heat jacket and/or insulating covering 14. Paste introduced into the bottom of the baffle chamber 12, overflows said chamber and moves toward the bottom of vessel 13 and into line 15 without producing channelling. The small needle valve 20 on the top of the tank is used only to vent off non-condensible gases and does not effectively lower the uressunre inside the vessel 13. The level of paste in vessel 13 is regulated by the automatic level transmitter 16 which senses the pressure differential between the vapor at the top of vessel 13 and the hydraulic pressure in line 15, and through controller 17, automatically adjusts the opening of valve 18 to control the flow of paste through line 19.

The paste from valve 18 flashes to atmospheric pressure through line 21 into a centrifugal separator 22. Steam and other vapors are removed through vent 23 while the final product flows through line 24. Water can be metered into the separator 22 through line 26 with the aid of a metering pump 25.

In the examples which follow the viscosity was directly measured in centipoise units by means of a Brookfield viscometer using a #1 spindle at 20 revolutions per minute.

*Example 1*

A slurry containing 2 lbs. dry substance (D.S.) starch per gallon was made in the slurry vessel 1 and passed at a speed of 6 gallons per minute through the injector heater 5 operated at a steam pressure of about 100 p.s.i.g. The tank 13 of about 50 gallon capacity was heated to 300° F. and was maintained substantially full at a pressure of 100 p.s.i.g. Dilution water at 95° F. was added at 26 in accordance with the table below.

| Dilution water (g.p.m.) | Percent dry substance (oven method) | Viscosity (cps.)* |
|---|---|---|
| 0 | 18.2 | 66 |
| 1 | 17.4 | 55 |
| 2 | 13.7 | 26 |
| 3 | 13.2 | 26 |
| 4 | 12.2 | 18 |
| 5 | 11.1 | 19 |
| 6 | 9.5 | 18 |

*Brookfield viscometer, #1 spindle at 20 r.p.m. samples read at 140° F.

The above viscosities match the viscosity characteristics of a starch which has been chemically preconverted in the suppliers' plant. For example; the viscosities correspond to what are commonly known in the trade as low viscosity oxidized starches or ethylated starches depending on the modification involved.

*Example 2*

The process was conducted as in Example 1 except that a slurry with 2.5 lbs./gal. of D.S. starch, a pump speed of 5 gal./min., a cooking temperature of 295° F. and a tank pressure of 100 p.s.i.g., were employed. Various proportions of dilution water at 95° F. were added, as indicated, produced samples with the properties set forth in the following table:

| Dilution water (g.p.m.) | Percent solids (RI)* | Dilution temp. | Viscosity (cps.) | At sample temp. |
|---|---|---|---|---|
| 0 | 25 | 210 | 420 | 136 |
| 2.9 | 15 | 206 | 56 | 135 |
| 4.0 | 14 | 203 | 42 | 140 |
| 4.8 | 12 | 199 | 41 | 137 |
| 7.3 | 10 | 186 | 26 | 139 |
| 8.9 | 8 | 176 | 24 | 140 |
| 10 | 7 | 163 | 18 | 140 |

*RI=Refractive index which was used as a direct indication of solids content using an Erma pocket refractometer with the standard 0–27% starch solids scale.

*Example 3*

In this example the process was conducted so as to obtain a 15% final solids paste for use directly in the machine sizing of food grade board. The original slurry contained 2.5 lbs./gal. of D.S. starch, the pump speed was 5 gal./min., the cooking tank was maintained substantially full and at a temperature of 295–300° F. The dilution water was at 70° so as to provide a paste temperature of about 150° F. when said paste reaches the sizing machine. The following samples were taken at about 15 min. intervals:

| Dilution water (g.p.m.) | Percent solids (RI) | Viscosity (cps.) | At sample temp. |
|---|---|---|---|
| 3.2 | 15 | 60 | 130 |
| 3.2 | 15 | 49 | 140 |
| 3.2 | 15.5 | 30 | 140 |
| 3.3 | 15 | 31 | 140 |
| (1) | 15 | 36 | 140 |
| (2) | 15 | 32 | 140 |
| 3.4 | 15 | 38 | 132 |
| 3.4 | 15 | 31 | 133 |
| 3.4 | 16.5 | 38 | 142 |
| 3.4 | 18 | 82 | 140 |
| (1) | 16.5 | 40 | 138 |

[1] Sample of composite.
[2] Sample of composite held 1 hr.

The "composite" referred to in the table were mixtures of equivalent portions of the samples immediately thereabove.

Samples of the board coated with this product were compared with samples of the board coated with an equivalent viscosity oxidized starch. Test results were substantially equivalent except for a lowering of the air permeability of the board coated with the pressure converted product.

*Example 4*

The process was conducted as in Example 3 but with a slurry of 3 lbs./gal. of D.S. starch and with dilution water added at the rate of about 5.1 gals./min. to provide a final paste of about 14% solids. The resultant pastes had a slightly higher viscosity than those of Example 3.

The features and principles underlying the invention described above in connection with specific exemplifications will suggest to those skilled in the art many other modifications thereof. It is accordingly desired that the appended claims shall not be limited to any specific feature or details thereof.

We claim:

1. A process for the continuous production of starch pastes comprising,
    providing an aqueous slurry containing about 0.5 to 3 lbs./gal. of starch,
    continuously feeding the slurry in the form of a stream to a steam injection heating device and
    instantly heating said starch slurry with steam at a gauge pressure of about 60 to 140 pounds per square inch to convert said slurry to starch paste,
    continuously introducing the stream of heated starch paste below the surface of the starch paste just previously prepared in a pressure converting zone maintained at a temperature of between 250° F. and 350° F. whereby to continue the cooking of the starch paste and
    feeding the converted starch paste into a vessel at atmospheric pressure.

2. The process as claimed in claim 1, comprising separating steam and vapors from the converted starch after the pressure on the same has been reduced to atmospheric.

3. The process as claimed in claim 2, comprising diluting the starch paste with water while said steam and vapors are being separated therefrom.

4. The process as claimed in claim 1 comprising positively forcing the slurry stream through the treatment steps at a rate such that each minute portion thereof is retained in the heating and converting zone for a period of 5 to 12 minutes.

References Cited by the Examiner
UNITED STATES PATENTS

| | | | |
|---|---|---|---|
| 2,805,966 | 9/1957 | Etheridge | 127—28 |
| 2,940,876 | 6/1960 | Elsas | 127—28 |
| 2,980,576 | 4/1961 | Etheridge | 127—28 |
| 3,067,067 | 12/1962 | Etheridge et al. | 127—71 |
| 3,101,284 | 8/1963 | Etheridge | 127—69 |
| 3,103,451 | 9/1963 | McDonald et al. | 127—71 |

MORRIS O. WOLK, *Primary Examiner.*